United States Patent [19]
Freudendahl

[11] Patent Number: 5,829,734
[45] Date of Patent: Nov. 3, 1998

[54] SHUT-OFF VALVE

[75] Inventor: Erling Freudendahl, Galten, Denmark

[73] Assignee: Aage V. Kjaers Maskinfabrik A/S, Galten, Denmark

[21] Appl. No.: 765,677

[22] PCT Filed: Jul. 6, 1995

[86] PCT No.: PCT/DK95/00290

§ 371 Date: Jan. 6, 1997

§ 102(e) Date: Jan. 6, 1997

[87] PCT Pub. No.: WO96/01964

PCT Pub. Date: Jan. 25, 1996

[30] Foreign Application Priority Data

Jul. 7, 1994 [DK] Denmark ................................. 0814/94

[51] Int. Cl.$^6$ ................................................. F16K 31/50
[52] U.S. Cl. ......................... 251/267; 137/375; 74/424.8; 251/284; 251/326; 251/330
[58] Field of Search .................... 251/265, 266, 251/267, 326, 327, 328, 329, 284, 330; 137/375; 74/424.8 VA

[56] References Cited

U.S. PATENT DOCUMENTS

| | | | |
|---|---|---|---|
| 1,221,052 | 4/1917 | Henry, Jr. ................................ | 251/266 |
| 1,300,200 | 4/1919 | Snow ...................................... | 251/267 |
| 3,662,778 | 5/1972 | Leopold, Jr. et al. ................... | 251/267 |
| 3,957,245 | 5/1976 | Daghe ..................................... | 251/267 |
| 4,483,512 | 11/1984 | Drapeau ................................. | 251/265 |
| 4,488,704 | 12/1984 | Wicker ................................... | 251/265 |
| 4,532,957 | 8/1985 | Battle ..................................... | 251/266 |
| 5,188,338 | 2/1993 | Itoi ......................................... | 251/265 |
| 5,279,320 | 1/1994 | Freudendahl .......................... | 251/267 |

FOREIGN PATENT DOCUMENTS

| | | |
|---|---|---|
| 871.203 | 4/1942 | France . |
| 212655 | 12/1960 | Germany ................................ 251/267 |
| 1600813 | 5/1970 | Germany . |
| 4101075 | 8/1991 | Germany . |
| 385952 | 4/1973 | Sweden . |
| 459.115 | 6/1989 | Sweden . |

*Primary Examiner*—George L. Walton
*Attorney, Agent, or Firm*—Scully, Scott, Murphy & Presser

[57] ABSTRACT

A shut-off valve (1, 101) including a valve housing (2, 102) having a flow passageway (3, 103); a shut-off member (22, 122) displaceably arranged in the housing between an open position and a closed position of the valve flow passageway through an actuator device (15, 115). The actuator device includes a nut member (20, 120) provided with an internal thread (21, 121) having a first thread pitch, and an outer stem member (17, 117) provided with an external thread (19, 119) engaging the internal thread (21, 121) of the nut member, and with an internal thread (18, 118) (21, 121) with a second pitch differing from the first pitch and engaging a corresponding external thread (12, 112) on an inner stem member (6, 106). The threads coacting during the major part of the closing movement of the shut-off member (22, 122) are provided with larger pitch than those coacting during the final part of the closing movement. First coacting stop elements (28, 29; 128, 129) are provided between the two members interengaged by the threads with the largest pitch, the stop elements being adapted to engage each other at the end of the closing movement to ensure a joint turning of the two members in relation to the third member during the final part of the closing movement.

15 Claims, 6 Drawing Sheets

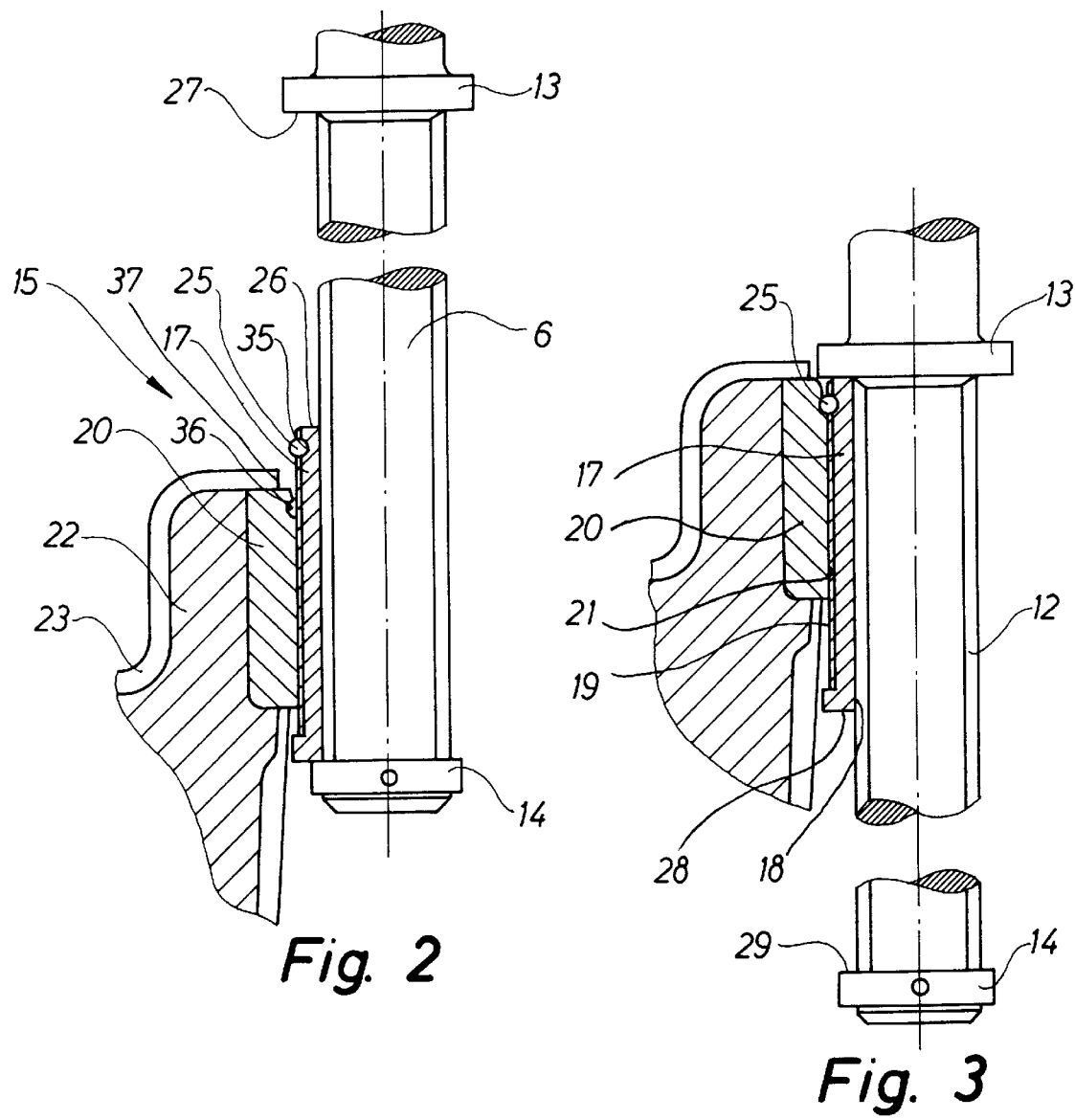

SHUT-OFF VALVE

TECHNICAL FIELD

The invention relates to a shut-off valve comprising a valve housing provided with a flow passageway and a shut-off member arranged in said housing and displaceable by means of an actuator device of the stem/nut type between a position, in which the flow passageway is open and a position, in which it is closed, said actuator device comprising a nut member provided with an internal thread with a first pitch, and an outer stem member provided with an external thread engaging the internal thread of the nut member, first coacting stop means being provided between the outer stem member and the nut member, said stop means adapted to engage each other at the end of the closing movement to ensure a joint turning of the two members in relation to the third member during the final part of the closing movement.

TECHNICAL BACKGROUND

A screw/nut device is known from FR 871.203, in which one and the same stem on a first portion is provided with a thread with a large pitch for rapid travel, and on a second subsequent portion is provided with a thread with a small pitch for a more slow travel with great force. In order to engage in both threads, the nut member of this special stem has to comprise a number of projections instead of a conventionally screw thread. Such a nut member is difficult to manufacture and the stress on the individual projections is heavy. Moreover, two successive threads are bulky.

SE-B-385.952 discloses an actuator device of the screw/nut type comprising a threaded stem, upon which a stem nut is arranged having an internal thread engaging the stem and an external thread engaging an outer sleeve. Jointly with damping means, the stem nut is adapted to ensure a springy and damping stop function at the end of the movement of the stem.

Furthermore, U.S. Pat. No. 4,488,704 discloses a valve provided with an actuator device comprising a nut member having an external thread interengaging a mounting member connected to the valve housing. Moreover, the actuator device comprises a stem, at which lower end a shut-off member is arranged, said stem being provided with an external thread engaging an internal thread of the nut member. The nut member as well as the stem is provided with an operating handle. In the shown embodiment, the external thread of the nut member is more fine than its internal thread engaging the stem. As a result, a rapid movement of the shut-off member is obtained, when the handle of the stem is operated and a more slow and accurate movement of the shut-off member is obtained, when the handle of the nut member is operated. Owing to consideration of space and control, however, this valve is not particularly advantageous in that two operating means or handles are required.

DE-A1-4101075 discloses a valve of the type stated in the introduction. The outer nut member of the actuator device is arranged pivotally in relation to the valve housing and driven by means of a handle, whereas the inner stem member is fixed to the shut-off member. The outer stem member engages the outer nut member as well as the inner stem member by means of a coarse and a fine thread, respectively. During closing and opening of the valve, both the outer and the inner stem member is displaced in relation to the housing.

BRIEF DESCRIPTION OF THE INVENTION

The object of the present invention is to provide a shut-off valve of the type stated in the introduction, whereby a reliable sealing in the closed position at a lower closing torque than at known shut-off valves and still in keeping with the norms for the maximum number of rotations from open to closed position and without the drawbacks stated above.

The shut-off valve according to the invention is characterised in that the inner stem member is arranged rotatably, but not displaceably in relation to the valve housing and provided with an end portion projection out therefrom and adapted to be connected with a driving means, and that the nut member is secured to the shut-off member being provided with a cavity for receiving the outer stem member and thereby allowing for a displacement of the shut-off member relative to the stem members. As a result, the initial and the major part of the closing movement of the shut-off member takes place between the members interengaged by means of the threads with the large pitch, while the final part of the closing movement necessarily takes place by a movement between the two members interengaged by means of the thread having a small pitch and thus at a lower torque, when the stop means engage each other. Consequently, the closing torque necessary for obtaining sealing when the resilient sealing, areas are compressed, is substantially reduced, which is particularly important in large valves. This is an economic advantage in motor-driven shut-off valves, as the motor usually is dimensioned relative to the necessary maximum torque for the compression in the closing phase. A shut-off valve according to the invention may be provided with a smaller and thus less expensive motor than known valves. Correspondingly, according to the invention, hand-operated valves may be operated by means of substantially simpler and cheaper operation equipment than hitherto.

According to the invention, the first stop means comprises two mutually facing stop faces on the nut member and the outer stem member.

Moreover, according to the invention, the inner stem of the outer stem member and the nut member may comprise second coacting stop means adapted to be brought into engagement with each other during the opening movement to bring all of the members into a predetermined initial position. The closing movement of the shut-off valve is thereby more accurately controlled.

According to the invention, for ensuring a joint turning of the outer stem member and the inner stem member during the initial part of the closing movement, a releasable locking means may be arranged between said two members, said locking means being released when the two first stop means engage each other. As a result, it is ensured that the turning in the small thread is not effected before the final part of the closing movement.

Furthermore, according to the invention, the valve further comprises a sleeve circumscribing the inner stem member and the upper end of the outer stem member to allow a displacement of the two members relative to each other and having an engagement means to prevent disengagement of the two stem members. The use of such a sleeve ensures a more accurate operation of the shut-off member, as the risk of the outer stem member disengaging the inner stem member and falling off with the shut-off member inside the valve housing no longer exists.

The engagement means of the sleeve may be formed of an inwardly projecting flange coacting with a shoulder on the outer stem member to limit the displacement of the outer stem member.

Moreover, the releasable locking means may be formed of a flexible member secured to the inner stem member or the outer stem member and being in friction engagement with the other of said members in the locking position.

The releasable locking means may also be formed of a flexible member fixed to the outer stem member or the sleeve and being in friction engagement with the other of said members in the locking position.

The releasable locking means may thus be formed of a flexible ring being received by opposite grooves in mutually facing surfaces of the inner stem member and the outer stem member or of the outer stem member and the sleeve in the locking position.

Moreover, the releasable locking means may be formed of a flexible member, such as a disk spring, arranged between the outer stem member and a ledge on the inner stem member. As a result, a very simple structure is obtained, wherein opposite grooves in mutually facing surfaces of the members forming part thereof need not be provided. Furthermore, by using a disk spring, it is possible to preload the thread with the small pitch.

Finally, the ratio between the fine pitch and the coarse pitch may be >2, preferably between 3 and 10.

BRIEF DESCRIPTION OF THE DRAWINGS

The invention is explained in details below with reference to the drawings, in which FIG. 2 is a detailed view of an actuator device of the valve according to FIG. 1 in the closed position thereof, FIG. 3 is a detailed view of the actuator device in the open position of the valve.

BEST MODE FOR CARRYING OUT THE INVENTION

Figure 1:
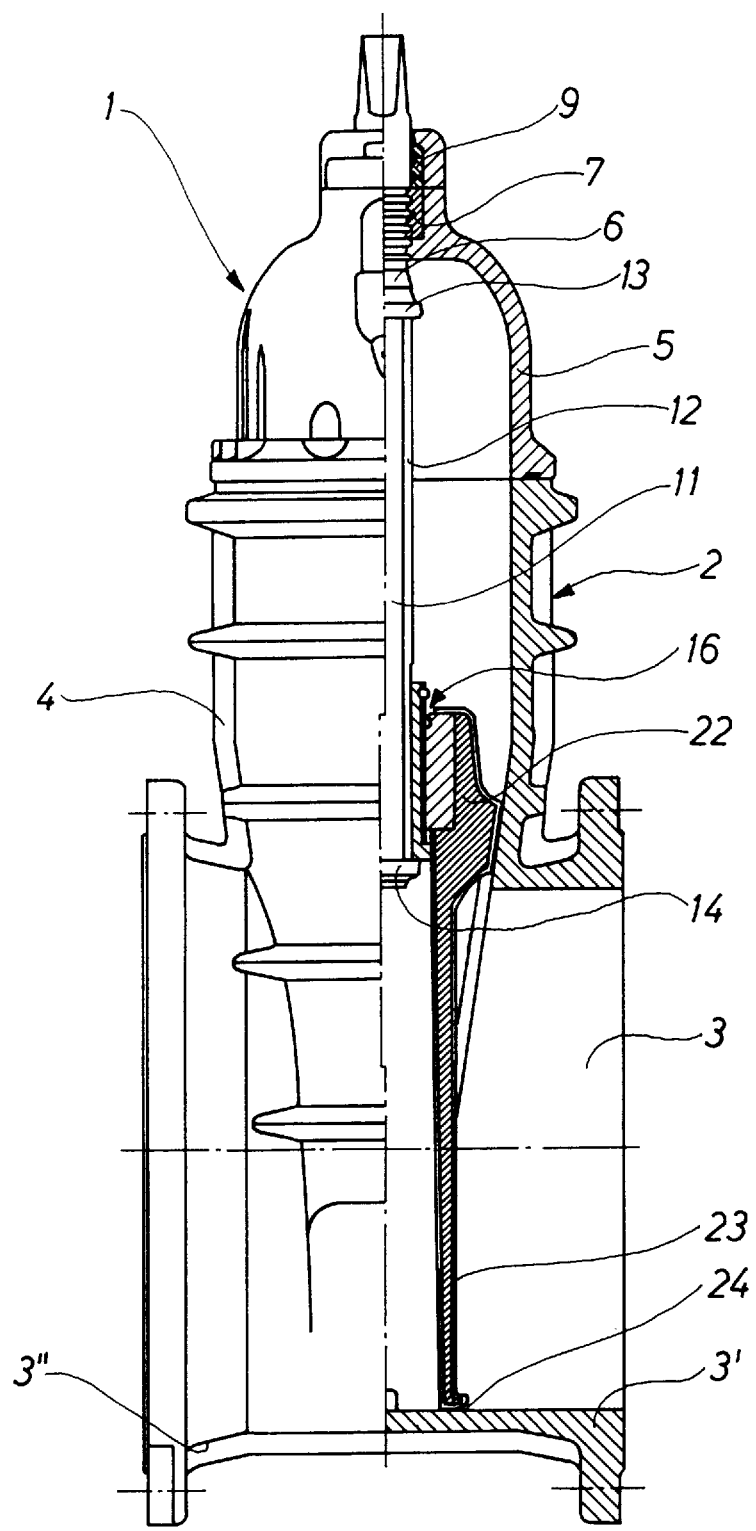
FIG. 1 is a partial, sectional view of the shut-off valve not forming part of the present invention.
Figure 4:
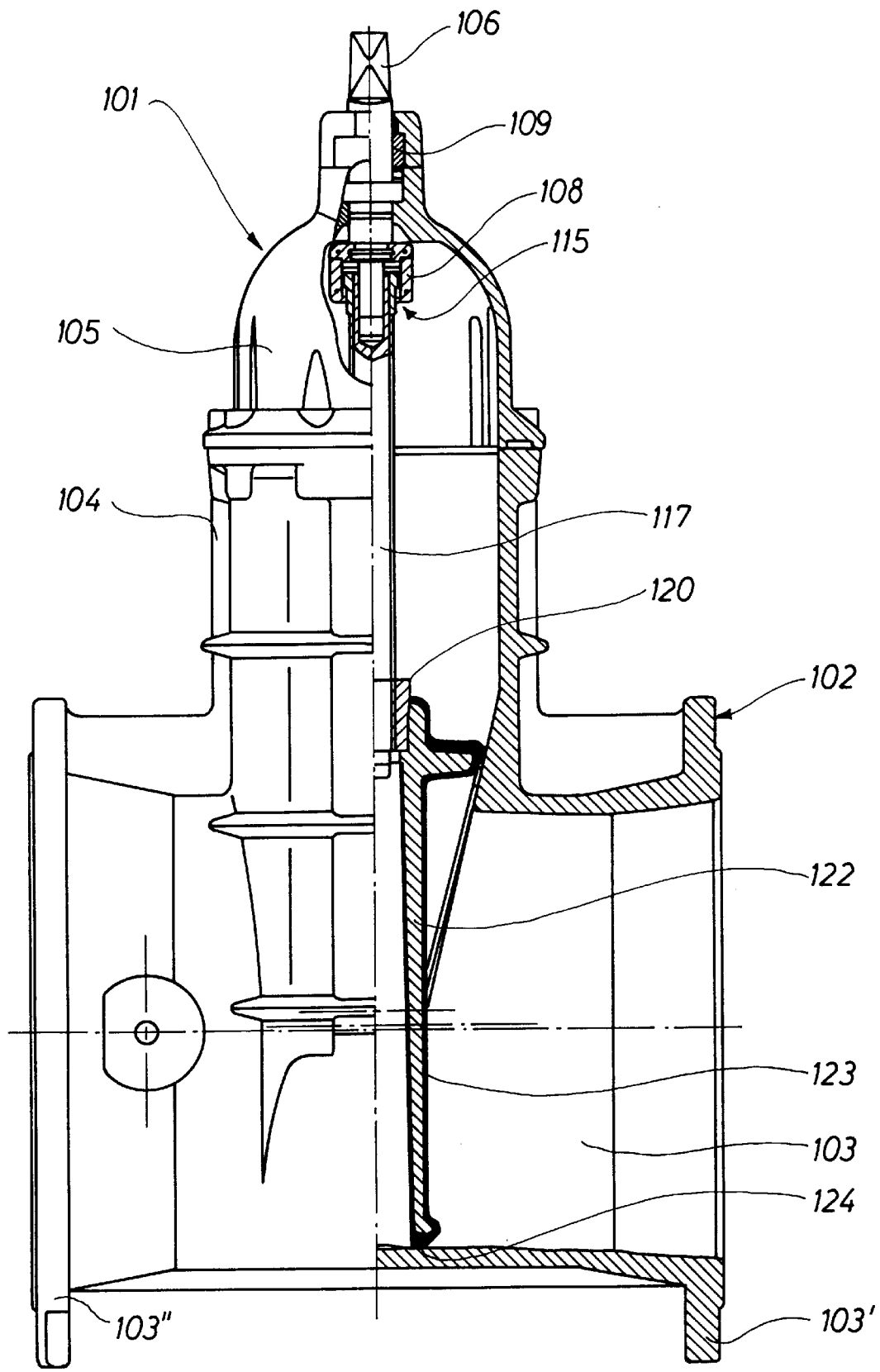
FIG. 4 shows an embodiment of a valve according to the invention.

The shut-off valve or gate valve 1 shown in FIGS. 1–3 comprises an essentially T-shaped valve housing 2 comprising a flow passageway 3 provided with an inlet portion 3' and an outlet portion 3" being aligned with one another and a branch portion 4 perpendicular thereto. In the longitudinal direction of the branch portion, a shut-off member or valve gate 22 is arranged in the housing 2, said shut-off member being displaceable between a closed position (FIG. 2), in which it closes the flow passageway, and an open position (FIG. 3), in which it opens said passageway. On its outer face, the shut-off member 22 is coated with a resilient material 23 to sealingly abut the seat faces 24 of the valve housing 2. The displacement of the shut-off member 22 is provided by means of an actuator device comprising an inner stem member 6 being rotatably arranged in a cap 5 secured to the branch portion 4 by bolts. By means of a ring 7, the inner stem member 6 is prevented from axial displacement and further provided with a sealing ring to prevent impurities from entering the valve and fluid from flowing out of the valve. The upper end of the stem member 6 extends beyond the cap 5 and may be actuated by a means 10 (not shown), such as a motor for turning the stem member 6.

Moreover, the inner stem member 6 is provided with an external threaded area 11 having a thread 12 for instance a trapezoidal thread. At the top, the threaded area 11 is defined by a first ledge 13 and at the bottom defined by a second ledge 14.

The actuator device 15 further comprises an outer stem member 17 and a nut member 20. The outer stem member 17 has an internal coarse thread 18 coacting with the coarse thread 12 of the inner stem member 6. Moreover, the outer stem member 17 has an external, fine thread 19 coacting with an internal, fine thread 21 on the nut member 20. The nut member 20 is secured to the upper end of the shut-off member 22. The shut-off member 22 is provided with a cavity allowing for displacement thereof and of the nut member 20 relative to the stem members during the closing and opening movement.

Between the nut member 20 and the outer stem member 17, a releasable locking means 25 is arranged in form of a flexible ring, in the example shown a spring ring of a circular cross section, received in an outer annular groove 35 close to the upper end of the outer stem member. In the locking position, the spring ring 25 is received in an inner annular groove 36 close to the upper end of the nut member and ensures a joint movement of the outer stem member 17 and the nut member 20 relative to the inner stem member 6.

The releasable locking means may optionally be formed of a flexible member of a resilient material, such as rubber, secured to the nut member or to the outer stem member and in the locking position being in friction engagement with the other of said members. Thus, the spring ring 25 may be replaced by a ring of a resilient material and fixed in the groove 35, said ring being in friction engagement with the opposite inner face of the nut member in the locking position. The locking means may optionally comprise the edge face 37 of the portion of the resilient coating of the valve gate protruding above the nut member and the peripheral face of a ledge projecting at the upper end of the outer stem member.

As shown in FIG. 3, in the initial position of the closing movement of the shut-off valve, i.e. the fully open position, the first or upper end face 26 of the outer stem member 17 abuts the stop face 27 of the first ledge 13, said face facing the nut member. Further, the outer stem member 17 is joined with the nut member 20 by means of the releasable locking means 25. When closing the shut-off member by turning the inner stem member 6, the initial and major part of the movement takes place in the coarse threads 12,18 between the inner and outer stem member 6,17, the nut member 20 being fixed to the outer stem member 17 by means of the releasable locking means 25. The lower end face 28 of the outer stem member 17 abuts the stop face 29 of the lower stem ledge 14 immediately before the valve is closed, whereby a continued turning in the coarse thread between the inner stem member and the outer member is prevented.

When turning is continued, the locking means 25 is released, the spring ring 25 disengaging the annular groove 36 in the nut member 20, whereby the movement may continue in the fine thread 19,21, until the shut-off member 22 abuts the seat faces 24 in the valve housing 2, while being compressed. This closed position is shown in FIG. 2.

When the shut-off member 22 reverts to its fully open position shown in FIG. 3, by turning the inner stem member in the opposite direction, the movement partly takes place in the fine threads 19,21 and partly in the coarse threads 12, 18, until the first end face 26 of the outer stem member 17 abuts the stop face 27 of the first ledge 13, and the outer stem member and the nut member are in the position, in which the releasable locking means 25 joins said member, (cf. FIG. 3).

In FIGS. 4, 5, 6 and 7, an embodiment of the shut-off valve 101 according to the invention is shown. This shut-off valve comprises an essentially T-shaped valve housing comprising a flow passageway 103 provided with an inlet portion 103' and an outlet portion 103" aligned with one another, and a branch portion 104 perpendicular thereto. In the longitudinal direction of the branch portion, a shut-off member or valve gate 122 is arranged in the housing 102, said shut-off member being displaceable between a closed position (FIG. 5), in which it closes the flow passageway, and an open position (FIG. 6), in which it opens said passageway. On its outer face, the shut-off member 122 is coated with a resilient material 123 to sealingly abut the seat faces 124 of the valve housing 102. The displacement of the shut-off member 122 is provided by means of an actuator device comprising an inner stem member 106 being rotatably arranged in a cap 105 secured to the branch portion 104 by bolts. The inner stem member 106 is prevented from axial displacement and further provided with a sealing ring 109 to prevent impurities from entering the valve and fluid from flowing out of the valve. The upper end of the stem member 106 extends beyond the cap 105 and may be actuated by a means (not shown), such as a motor for turning the stem member 106. Moreover, the inner stem member 106 is provided with a lower threaded area having a comparatively fine thread 112. The threaded area is at the top defined by a first ledge 113 provided with an annular groove 139 to receive a sealing ring 140.

The actuator device 115, further, comprises an outer stem member 117 and a nut member 120. The outer stem member 117 has an internal fine thread 118 coacting with an external fine thread 112 of the inner stem member 106. Moreover, the outer stem member 117 has an external coarse thread 119 coacting an internal coarse thread 121 of the nut member 120. The nut member 120 is secured to the upper end of the shut-off member 122. The shut-off member 122 is provided with a cavity allowing for displacement thereof and of the nut member 120 relative to the stem members during the closing and opening movement.

The actuator device 115 further comprises a sleeve 108 circumscribing the inner stem member 106 and the upper end of the outer stem member 117. The sleeve 108 acts to prevent the two stem members from disengaging. The sleeve is axially divided into two halves, for instance joined by means of bolts 132 and at its upper end provided with an inwardly projecting flange 148 overlapping a first ledge 113 of the inner stem member 106. Furthermore, at its lower end, the sleeve 108 is provided with a second flange 130 projecting inwardly and coacting with a shoulder 131 provided on the outer stem member to form a stop. The shoulder 131 is shown as a separate part secured to the remaining portion of the outer stem member 117 by means of a lock ring 133. However, said two parts may be integrally formed.

A releasable locking means 125 in form of a flexible ring 125 (in the example shown a spring ring of circular cross-section) is arranged between the sleeve 108 and outer stem member 117 in an outer annular groove 135 close to the upper end of the outer stem member. In the locking position, the spring ring 125 is received in an inner annular groove 136 close to the upper end of the sleeve and ensures a joint movement of the outer stem member 117 and the inner stem member 106 relative to the nut member 120. As indicated by means of a broken line in FIG. 5, the locking means may also be formed of a spring ring 145 arranged in an inner annular groove 138 on the outer stem member 117 and engaging an outer annular groove 137 on the inner stem member 106. The spring ring 125,145 may be replaced a ring of a resilient material retained in the groove 135,138, said ring being in friction engagement with the opposite inner face of the sleeve or the opposite inner face of the inner stem member in the locking position.

Figure 7:
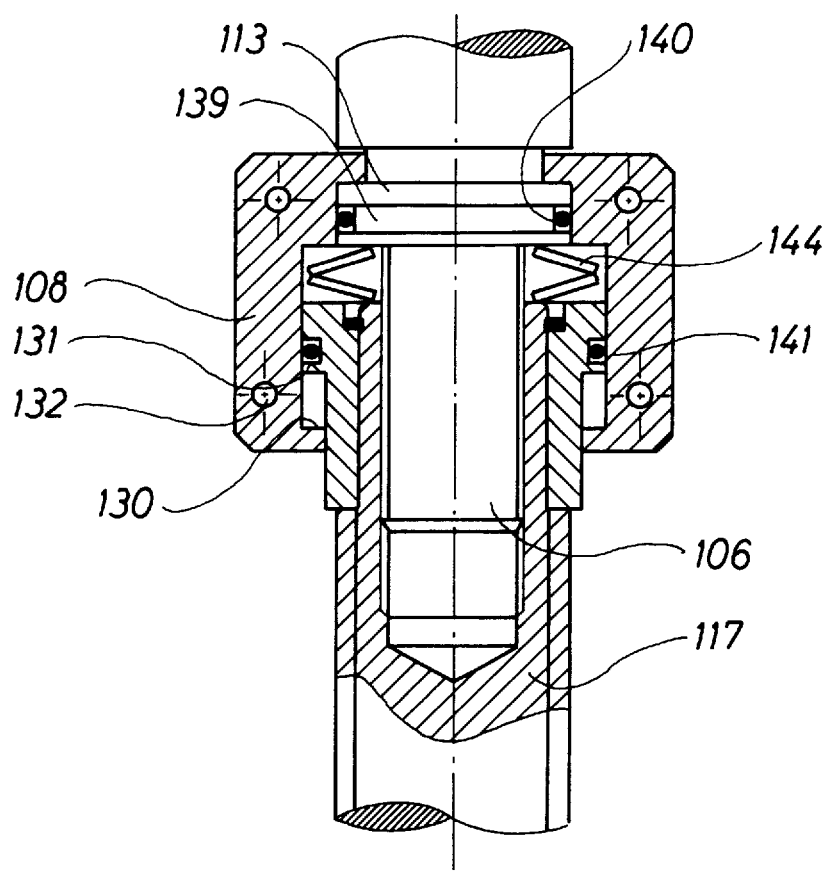

Finally, as shown in FIG. 7, the locking means may comprise a spring member, comprising two disk springs 144 arranged between the upper face of the outer stem member 117 and the first ledge 113 provided on the inner stem member 106. The disk springs 144 preload the fine thread 112,118 slightly with a view to avoiding that the starting torque of the motor causes an unwanted movement of the outer stem member 117 relative to the inner stem member 106, when the motor is activated.

Figure 6:
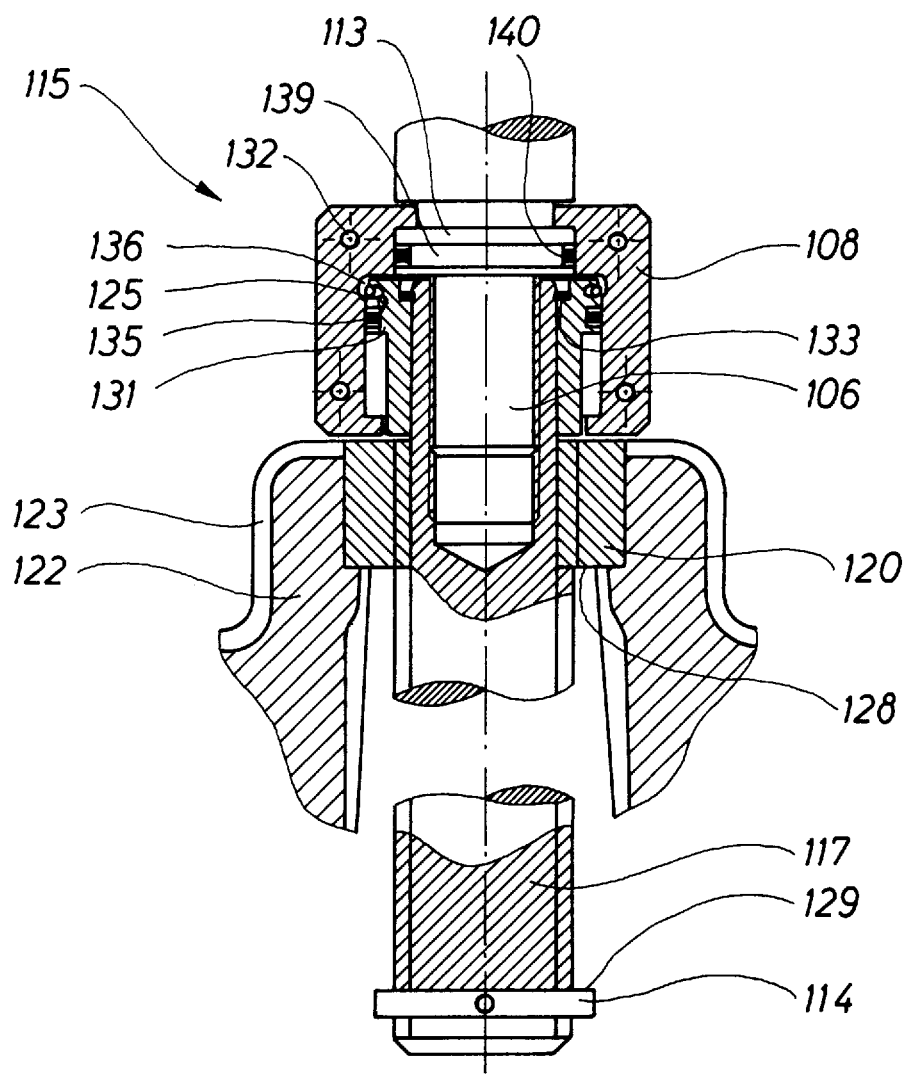
FIG. 6 is a detailed view of the actuator device in the open position of the valve and, FIG. 7 is a detailed view of the actuator device, in which the locking means between the two stem members comprises disk springs.

The closing movement of the shut-off member takes place as follows. As shown in FIG. 6, in the fully open initial position of the valve, the end face 126 of the outer stem member abuts the stop face 127 of the first ledge 113, the outer stem member 117 and the sleeve 108 being joined by means of the releasable locking means 125. When closing the shut-off valve by turning the inner stem member 106, the initial and major part of the closing movement takes place in the coarse thread 119,121. By a joint turning of the inner stem member 106 and the outer stem member 117 relative to the nut member 120, the nut member 120, and thus the shut-off member 122, is moved downwardly in the branch portion 104 and into the passageway 103.

At the end of the closing movement, the lower face 128 of the nut member 120 abuts the stop face 129 of a second ledge 114 on the outer stem member 117 and thus prevents a continued displacement between the two members.

Figure 5:
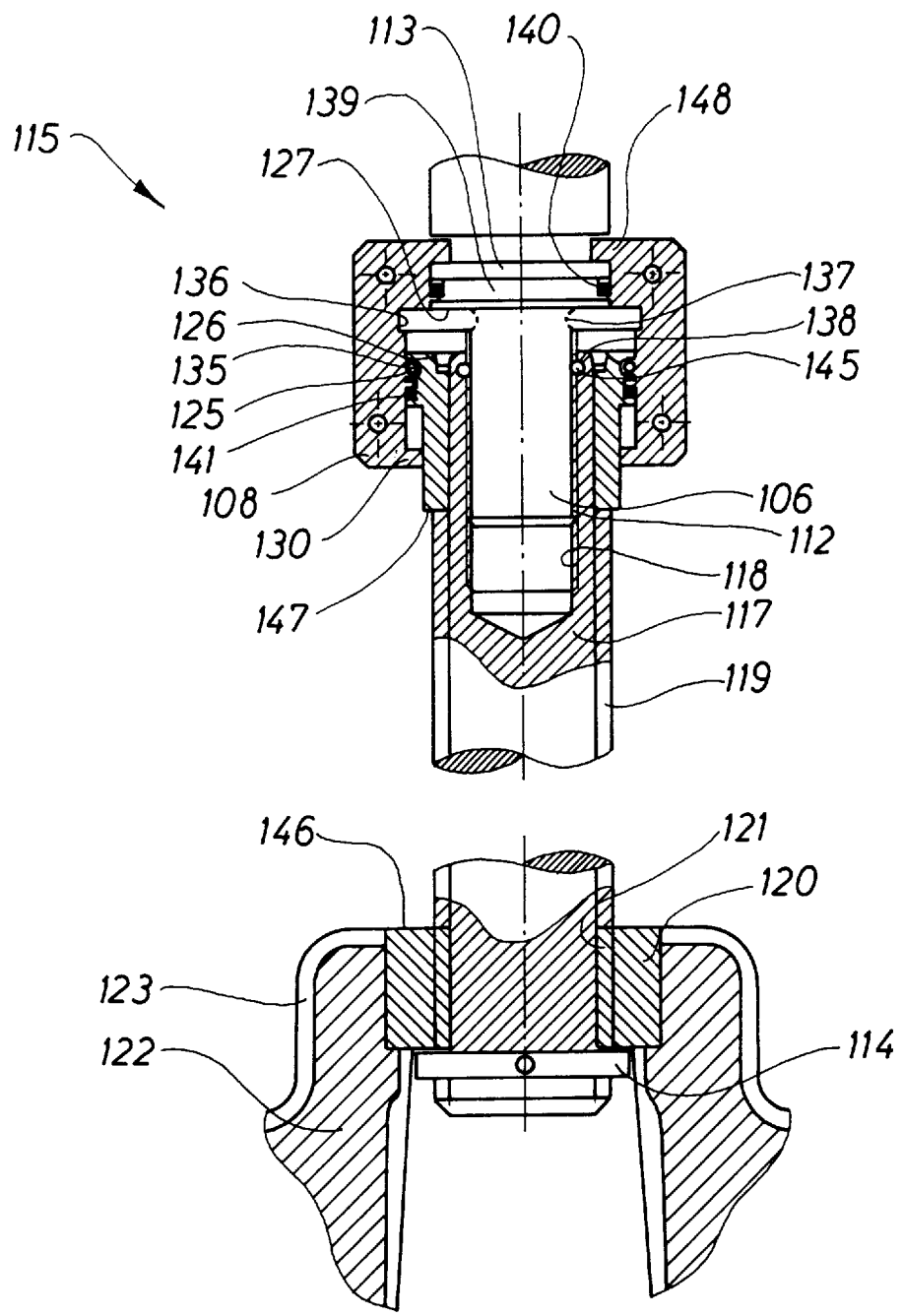
FIG. 5 is a detailed view of an actuator device of the valve according to FIG. 4 in the closed position thereof.

At a sustained turning of the inner stem member 106, the locking means 125 is released and the inner stem member 106 rotates relative to the outer stem member 117, the movement thus continuing in the fine thread 112,118, whereby the outer stem member 117 and consequently the shut-off member 122 are moved downwards, until the latter abuts the seat faces 124 in the valve housing 102, while being compressed. This closed position is shown in FIG. 5.

When the shut-off member 122 reverts to its fully open position, the movement partly takes place in the fine threads 112,118 and partly in the coarse threads 119, 121, until the upper face 146 of the nut member 120 abuts the lower face 147 of the shoulder 131 of the outer stem member 117, and the latter is in locking engagement with the sleeve 108, cf. FIG. 6.

In the embodiment shown in FIG. 7, in which the locking means comprises disk springs, the opening movement is continued, until the outer stem member 117 abuts the spring disks 144 by its stop face and compresses said disks.

The invention is not limited to the described embodiments and may be varied within the scope of the attached claims. As an example, the sleeve may be omitted in embodiments, as it is superfluous, if the thread is formed in such a manner that the resistance to turning in the small thread exceeds the resistance to turning in the large thread.

I claim:

1. A shut-off valve (101) comprising a valve housing (102) provided with a flow passageway (103) and a shut-off member (122) arranged in said housing, an actuator device (155) of the stem/nut type for displacing said shut-off member between a position in which the flow passageway is open and a position in which the flow passageway is closed, said actuator device comprising a nut member (120) with an internal thread (121) possessing a first pitch, and an outer stem member (117) with an external thread (119) engaging the internal thread (121) of the nut member, and an internal thread (118) possessing a second pitch which is smaller than the first pitch and cooperatively engaging a external thread (112) on an inner stem member (106), and wherein first coacting stop means (128,129) are provided between the outer stem member (117) and the nut member 120), said coacting stop means (128, 129) engaging each other at the end of the closing movement of said shut-off member to ensure a joint movement of the outer stem member (117) and the nut member (120) in relation to the inner stem member during the final part of the closing movement, characterized in that the inner stem member (106) is arranged rotatably, but not axially displaceably relative to the valve housing (102) and includes an end portion projection extending outwardly therefrom adapted to be connected with driving means, the nut member (120) being secured to the shutoff member (122), said shut-off member (122) being provided with a cavity for receiving the outer stem member (117) and thereby allowing for an axial displacement of the shut-off member (122) relative to the stem members, and a releasable locking means (125, 145, 225) acting between the outer stem member (117) and the inner stem member (106), said locking means being adapted to ensure a joint turning of said two members relative to the nut member (120) during the initial part of the closing movement, and to be released when the two first stop means (128, 129) engage each other.

2. A shut-off valve (101) as claimed claim 1, characterised in that the first stop means comprises mutually facing stop faces (128, 129) on the nut member (129) and the outer stem member (117).

3. A shut-off valve (101) as claimed in 1, characterised in that the inner stem member (106), the outer stem member (117) and the nut member (120) comprise second coacting stop means (126, 127; 146, 147) adapted to be brought into engagement with each other during the opening movement to bring all of the members (106;117;120) into a predetermined initial position.

4. A shut-off valve (101) as claimed in claim 1, characterised in that it further comprises a sleeve (108) circumscribing the inner stem member (106) and the upper end of the outer stem member (117) to allow a mutual displacement of the two members and having an engagement means (130) to prevent disengagement of the two stem members (106, 117).

5. A shut-off valve (101) as claimed in claim 1, characterised in that the engagement means of the sleeve (108) is formed of an inwardly projecting flange (130) coacting with a shoulder (131) on the outer stem member (117) to limit the displacement of the outer stem member.

6. A shut-off valve (101) as claimed in claim 5, characterised in that the releasable locking means (145) is formed of a flexible member fixed to the inner stem member (106) or the outer stem member (117) and being in friction engagement with the other of said member in the locking position.

7. A shut-off valve (101) as claimed in claim 5, characterised in that the releasable locking means (125) is formed of a flexible member fixed to the outer stem member (117) or the sleeve (120) and being in friction engagement with the other of said member in the locking position.

8. A shut-off valve (101) as claimed in claims 4 and 5, characterised in that the releasable locking means (125,145) is formed of a flexible ring received in opposite grooves (135,136,137,138) in mutually facing faces of the inner stem member (106) and the outer stem member (117) or of the outer stem member (117) and the sleeve (108) in the locking position.

9. A shut-off valve (101) as claimed in claims 4 and 5, characterised in that the releasable locking means (145) is formed of a flexible member, such as a disk spring (144) arranged between the outer stem member (117) and a ledge (113) on the inner stem member (106).

10. A shut-off valve (101) as claimed in claim 1, characterized in that it further comprises a sleeve (108) circumscribing the inner stem member (106) and the upper end of the outer stem member (117) to allow a mutual displacement of the two members and having an engagement means (130) to prevent disengagement of the two stem members (106, 117).

11. A shut-off valve (101) as claimed in claim 4, characterized in that the releasable locking means (125) is formed of a flexible member fixed to the outer stem member (117) or the sleeve (120) and being in friction engagement with the other of said member in the locking position.

12. A shut-off valve (101) as claimed in claim 11, characterized in that the releasable locking means (125,145) is formed of a flexible ring received in opposite grooves (135, 136, 137, 138) in mutually facing faces of the inner stem member (106) and the outer stem member (117) or of the outer stem member (117) and the sleeve (108) in the locking position.

13. As shut-off valve (101) as claimed in claim 12, characterized in that the releasable locking means (145) is formed of a flexible member, such as a disk spring (144) arranged between the outer stem member (117) and a ledge (113) on the inner stem member (106).

14. A shut-off valve (101) as claimed in claim 11, characterized in that the engagement means of the sleeve (108) is formed of an inwardly projecting flange (130) coacting with a shoulder (131) on the outer stem member (117) to limit the displacement of the outer stem member.

15. A shut-off valve (101) as claimed in claim 11, characterized in that the releasable locking means (145) is formed of a flexible member fixed to the inner stem member (106) of the outer stem member (117) and being in friction engagement with the other of said member in the locking position.

* * * * *

UNITED STATES PATENT AND TRADEMARK OFFICE
CERTIFICATE OF CORRECTION

PATENT NO. : 5,829,734
DATED : November 3, 1998
INVENTOR(S) : Erling Freudendahl It is certified that error appears in the above-identified patent and that said Letters Patent is hereby corrected as shown below:

Title page,
[54] TITLE: "SHUT-OFF VALVE" should read -- A SHUT-OFF VALVE --

Column 2,
Line 36, "stem of the" should read -- stem member, the --

Column 7, claim 1:
Line 7, "120)" should read -- (120) --

Column 7, claim 6:
Line 51, "5" should read -- 1 --

Column 8, claim 8:
Line 6, "4ands" should read -- 1 --

Culumn 8, claim 9:
Line 13, "4ands" should read -- 1 --

Column 8, claim 11:
Line 26, "4" should read -- 1 --

Column 7, claim 1:
Line 7, "120)" should read -- (120) --

UNITED STATES PATENT AND TRADEMARK OFFICE
CERTIFICATE OF CORRECTION

PATENT NO. : 5,829,734
DATED : November 3, 1998
INVENTOR(S) : Erling Freudendahl It is certified that error appears in the above-identified patent and that said Letters Patent is hereby corrected as shown below:

Column 7, Claim 6:
Line 51, "5" should read -- 1 --

Column 8, claim 8:
Line 6, "4ands" should read -- 1 --

Column 8, claim 9:
Line 13, "4ands" should read -- 1 --

Column 8, claim 11:
Line 26 "4" should read -- 1 --

Signed and Sealed this

Eighteenth Day of September, 2001

*Attest:*

NICHOLAS P. GODICI
*Attesting Officer*   *Acting Director of the United States Patent and Trademark Office*